June 9, 1942.   R. H. JORDAN   2,285,816
KITCHEN UTILITY DEVICE
Original Filed Nov. 23, 1938
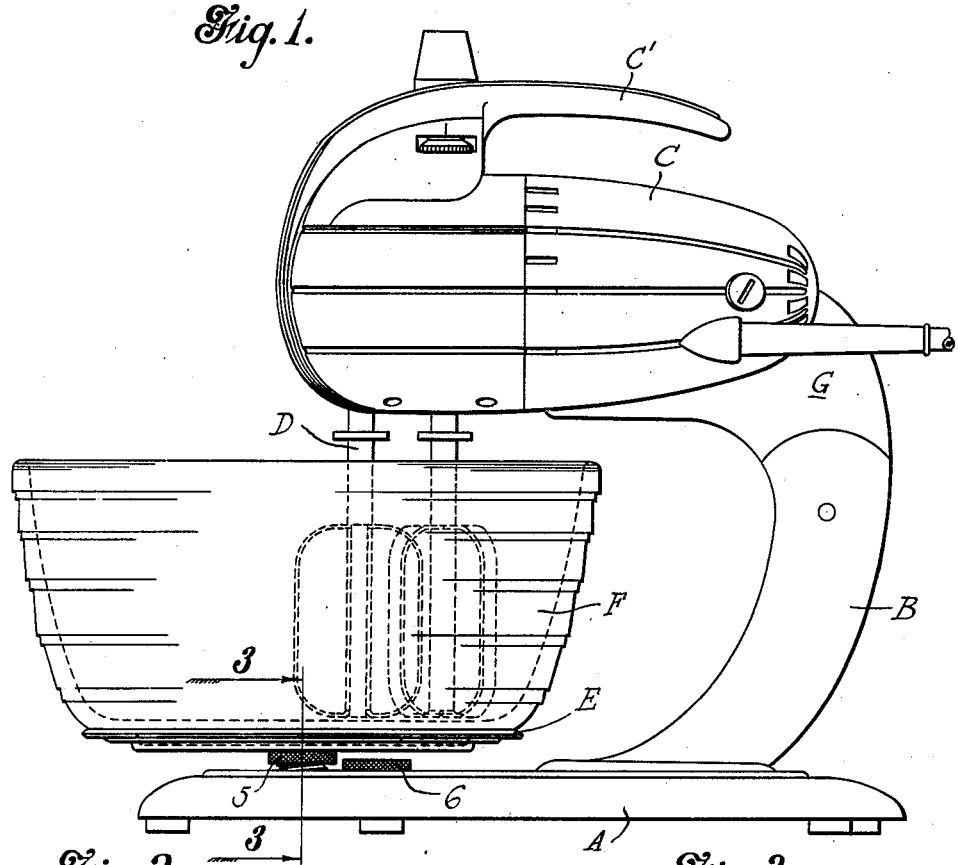
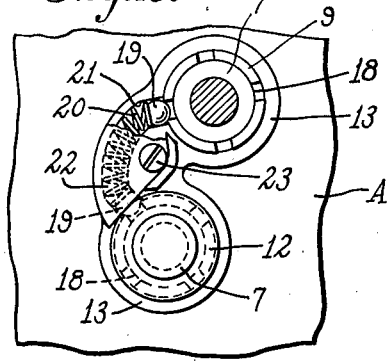
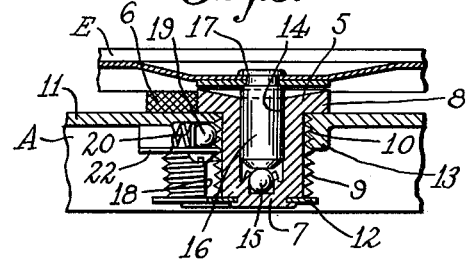
Inventor
Richard H. Jordan
By Rockwell Bartholow
Attorneys Patented June 9, 1942

2,285,816

UNITED STATES PATENT OFFICE 2,285,816

KITCHEN UTILITY DEVICE

Richard H. Jordan, Hamden, Conn., assignor to The A. C. Gilbert Company, New Haven, Conn., a corporation of Maryland Original application November 23, 1938, Serial No. 241,966. Divided and this application February 19, 1941, Serial No. 379,617

2 Claims. (Cl. 259—1)

This application is a division of my application Serial No. 241,966, filed November 23, 1938, now Patent No. 2,247,707, dated July 1, 1941.

The invention relates to electrically operated kitchen utility devices for mixing, beating and extracting edible products.

The invention relates to that class of devices in which electrically driven agitators or beaters operate in a mixing bowl mounted on a turntable so as to be freely rotatable.

One of the objects of the invention is to provide means whereby the distance of the beater or beaters from the bowl bottom can be controlled at will, so that the beater or beaters will have the optimum effect upon the particular material being treated.

Another object is to provide a turntable support in a device of this class which can be maintained under a nice control so far as height adjustment of the turntable with respect to the beater is concerned.

Another object is to prevent the turntable-receiving socket, after once being adjusted for height, from being jarred or otherwise inadvertently dislodged or shifted from its adjustment.

To these and other ends the invention consists in the novel features and combinations of parts to be hereinafter described and claimed.

In the accompanying drawing:

Fig. 1 is a side elevation of a kitchen utility device embodying my improvements, showing a large mixing bowl in position on the turntable;

Fig. 2 is a detail bottom view of a portion of the base showing the mixing bowl adjusting means; and Fig. 3 is a section on line 3—3 of Fig. 1.

In general the type of kitchen utility device illustrated is well known. This device comprises a base, indicated generally at A, a pedestal B, a motor member C overhanging the base, and depending agitators or beaters D. On the base A is a rotary turntable E adapted to support a mixing bowl F in which the beaters operate. The motor member has a detachable connection with a bracket G at the upper end of the pedestal, and is provided with a handle C' by means of which it can be held by the hand of the operator when detached from its support.

The base A is equipped with two socket members 5 and 6, either of which is intended to support a mixing bowl rotatably through the medium of the turntable E. When the latter is mounted in the member 5, the bowl F, which is a large bowl, will be located relatively to the agitators D in the manner indicated in Fig. 1, it being noted that in this particular instance one agitator is arranged in advance of the other, the shafts of the agitators being disposed in a plane slightly offset from and substantially parallel to a vertical plane passing lengthwise through the motor member at the center thereof. Other arrangements can, however, be adopted without in any manner affecting the subject matter of the present invention. In this case socket member 5 is in line with the vertical center plane of the motor member, which plane also passes through the center of pedestal B, but this also is not essential. The socket member 6 is somewhat offset with respect to socket member 5 and closer to the pedestal, and enables a smaller bowl (not shown) to be mounted on the turntable to cooperate operatively with the agitators.

The socket members 5 and 6 are mounted in the base A for vertical adjustment in the manner shown in Figs. 2 and 3. Each socket member is of cup-shaped formation having a closed bottom portion 7 and an upper lateral flange or rim 8. The outer surface of the socket member body is provided with screw threads 9 engaging a tapped hole 10 in the upper wall 11 of the base member, so as to be capable of being screwed upwardly and downwardly therein. The bottom portion of the socket member is surrounded by a washer 12 clinched in an annular groove and acting as a stop which abuts shoulder 13 to limit upward adjustment of the socket member, whereas downward movement of the socket member is limited by the flange 8 coming in contact with the upper surface of the base. The socket member has a socket 14 in the bottom of which is clinched an anti-friction ball 15 adapted to support from below a swiveling pin 16 carried by the turntable E and introduced into the socket member. The swiveling pin 16 is non-rotatably connected as by riveting to the sheet metal turntable body, as indicated at 17, and the exterior side surface of the pin 16 engages the inner surface of socket 14, while the lower reduced end of pin 16 rests on the ball 15. In this manner the turntable is mounted for very free rotation in the socket member, although tipping is effectively prevented.

For convenience in turning each socket member manually from the upper part of the base for the purpose of raising and lowering it, the side surface of flange 8 is roughened as by knurling.

For the purpose of preventing the readily turnable socket member when adjusted from being shifted out of its adjustment by the slight vibration of the machine, or otherwise, I have provided means for preventing angular movement of the socket member except when it is desired to adjust the same. Preferably this means takes the forms shown in Figs. 2 and 3, wherein the socket member has the threads of its body interrupted at intervals by exterior longitudinal grooves 18, of which four are employed in the example shown. In association with each socket member is a spring-pressed device such as a ball 19 adapted to be pressed into any one of these grooves. In the particular form shown, where there are two socket members, a helical spring 20 is common to two balls 19, being interposed between them as shown in Fig. 2, so as to press one ball into a groove of one socket member, and the other ball into a groove of the other member. To enable this to be accomplished the spring 20 is arranged in a curved groove 21 at the under portion of the base, and is held in place in said groove by a cap plate 22, which in turn is held in place by a screw 23. It will be noted that by this arrangement the ball has a strong tendency to arrest rotation of the socket member every time it engages a groove. In this particular case it engages a groove at each quarter revolution of the socket member. By this arrangement the socket member, when once adjusted to give the proper vertical adjustment to the turntable and ball with respect to the beater or beaters, will not readily come out of adjustment.

For the optimum effect of the beater or beaters upon the material undergoing treatment, it is important that there be a nice adjustment of the distance of the beater from the bowl bottom, and it is also quite important that the adjustment when once made be maintained so long as the particular operation is being carried on. By my invention these improved results are brought about in an effective manner. Nevertheless, the means for adjusting and maintaining the adjustment of the socket member is of simple form and relatively inexpensive.

While I have shown a preferred form of the turntable mounting, it is to be understood that the invention can take other forms, and that various changes in the organization of parts and in the details can be made without departure from the principles of the invention or the scope of the claims.

What I claim is:

1. In a kitchen utility device of the type in which a motor-driven agitator depends into a mixing bowl mounted on a turntable arranged above and rotatably mounted with respect to a suitable base, a mounting for the turntable intended to receive a pin carried by and extending downwardly from the turntable, constructed to permit adjustment of the turntable height by manual manipulation from the top of the base and to maintain the adjustment against the effects of jarring and vibration, said mounting comprising a socket member open at the top receiving the mounting pin of the turntable and provided above the base and beneath the turntable with a lateral manipulating flange, said socket member having on the body thereof exterior threads engaging threads in the base structure so that by turning said flange said socket member can be vertically adjusted relatively to the base, said flange being adapted to engage the upper surface of the base in order to limit the downward movement of the socket member, the threads on the socket member being interrupted at intervals by substantially upright grooves, and a spring-pressed detent device movable laterally in the base structure at one side of said socket member adapted to engage said grooves successively as the socket member is turned and acting to prevent any substantial vertical dislocation of the socket member under the effects of jarring or vibration.

2. A kitchen utility device such as set forth in claim 1, in which the socket member is provided exteriorly adjacent the lower end with an inset stop washer engageable with the under surface of the base to limit the upward movement of the socket member.

RICHARD H. JORDAN.